United States Patent [19]

Stanaitis

[11] 3,816,820

[45] June 11, 1974

[54] PRE-ASSEMBLED TERMINAL SCREW AND WASHERS AND METHOD OF MANUFACTURE

[75] Inventor: Peter P. Stanaitis, Rockford, Ill.

[73] Assignee: Textron Inc., Providence, R.I.

[22] Filed: Oct. 2, 1972

[21] Appl. No.: 294,258

[52] U.S. Cl. ................. 339/263 R, 339/277 R
[51] Int. Cl. ............................. H01r 9/10
[58] Field of Search .......... 339/263, 269, 271, 277; 85/1 R; 151/37, 69

[56] References Cited
UNITED STATES PATENTS
2,946,039  7/1960  Grunwald et al. ............... 339/269
3,141,722  7/1964  Nielsen ........................... 339/269

Primary Examiner—Joseph H. McGlynn
Attorney, Agent, or Firm—Olson, Trexler, Wolters, Bushell & Fosse, Ltd.

[57] ABSTRACT

A threaded screw terminal for electrical connections and the like is provided which includes a screw member and at least two washers carried upon an upper portion of the screw member shank. When oriented in an upright position, the top washer is prohibited from dropping down the screw shank by a protuding ridge rolled into the shank. The bottom washer, however, is permitted to drop a limited distance away from the top washer and against the threads rolled into the lower portion of the screw member. The spacing thus created between the washers facilitates the attachment of an electrical wire, spade connector, or other connector to the terminal. The bottom washer can be urged into abutment against the connector (or against the top washer itself if no connector is present) by turning the screw member into an adjacent workpiece, thereby snugging the washers against one another, against any connector inserted between the workers, and against the screw head. In addition, a novel method of forming the fastener and the washer-retaining ridge on the screw member shank is described. A groove is formed in the shank, and the shank material displaced from the groove forms two adjacent ridges. The lower ridge is thereafter rolled back into the shank to permit the bottom washer to be snugged against the top washer.

7 Claims, 14 Drawing Figures

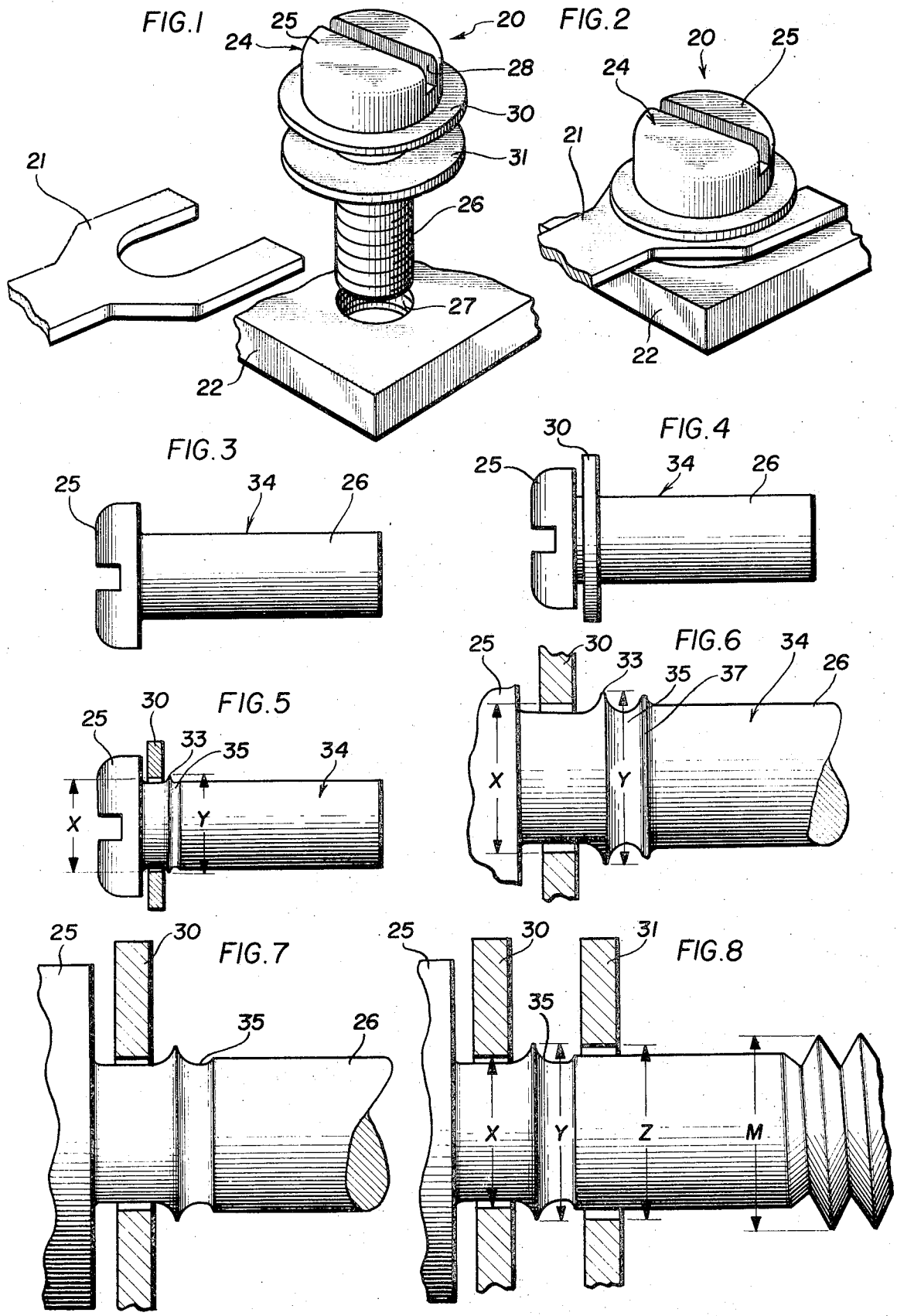

3,816,820

PRE-ASSEMBLED TERMINAL SCREW AND WASHERS AND METHOD OF MANUFACTURE

DESCRIPTION OF THE INVENTION

Recently, pre-assembled screw and washer type fasteners and electrical terminals have met with wide acceptance in component assembly projects. These pre-assembled devices, often called sems, include machine screw members of various sizes, types and shapes, upon which are mechanically pre-assembled washers of various types. In many of these devices, the major diameter of the screw member thread is formed to a size larger than the inner diameter of the washer member assembled thereon, thereby retaining the washer on the screw and preventing its loss.

These devices have proved effective in lowering assembly costs, for assembly time need not be devoted to assembling washers upon the screws before threading the screws into associated workpieces, and loss of separate washers and screws is eliminated.

These pre-assembled washer and screw devices, or sems, have been found to be particularly useful as electrical terminals used in the assembly of electrical components. Sems used in electrical assembly projects often include two washers pre-assembled and secured upon an unthreaded shank of the screw member. Between these two washers may be inserted an electric wire, a spade-type electrical connector, or other electrical junction member.

Even when utilizing sems fasteners and terminals, the assembly of electrical parts is often a difficult, delicate, and tedious task. Small electrical junctions or connectors must be carefully inserted between the two washers of the sems, and held in place while the screw member of the sems is tightened in place by turning it into the workpiece. Often, the washers are lodged together in abutting positions, making difficult the insertion of the connector between them. If the connector and the washers are of small size, the difficulty and tedium of the assembly task is increased. Misplacement of the electrical connector at a location other than between the two washers may delay the assembly process, or cause the finished workpiece to be rejected.

It is therefore the overall object of the present invention to provide a pre-assembled screw and washer type terminal which will speed the assembly of the products with which it is used.

More specifically, it is an object to provide a pre-assembled screw and washer-type terminal which will facilitate the rapid, positive and correct attachment of spade-type or other electrical connectors to associated workpieces.

It is another object to provide a pre-assembled screw and washer terminal wherein an attachment location for electrical connectors and the like can be created between a top and a bottom washer simply by orienting the screw and washer terminal in an upright position.

It is still another object to provide a pre-assembled screw and washer terminal of the described type at low cost by rapid production techniques.

Other objects and advantages of the invention will become apparent upon reading the following detailed description and upon reference to the drawings. Throughout the drawings, like reference numerals refer to like parts.

FIG. 1 is a perspective view showing in general aspect the novel pre-assembled screw and washer sems terminal of the present invention and an associated electrical connector member and workpiece;

FIG. 2 is a perspective view showing the sems and associated electrical connector as they appear in their finally assembled positions upon the associated workpiece;

FIG. 3 is a plan view of the terminal screw member blank in a relatively unformed condition;

FIG. 4 is a plan view similar to FIG. 3 showing the screw member blank and a top or a first washer assembled thereon;

FIG. 5 is a plan view similar to FIGS. 3 and 4 showing the screw member blank and top washer, the screw member shank having a washer-retaining ridge rolled upon its shank;

FIG. 6 is a fragmentary view showing in further detail portions of the screw member blank and assembled washer, and the groove and washer-retaining ridges formed upon the periphery of the screw member shank;

FIG. 7 is a fragmentary view similar to FIG. 6 showing portions of the screw member blank, the first washer, the retaining groove, and a single washer-retaining ridge, the second ridge having been removed from the screw member shank;

FIG. 8 is a fragmentary view similar to FIGS. 6 and 7 showing portions of the screw member blank and first washer, a second washer assembled upon the screw member shank, and screw threads rolled into the shank at a location relatively below the washers;

Figure 9:
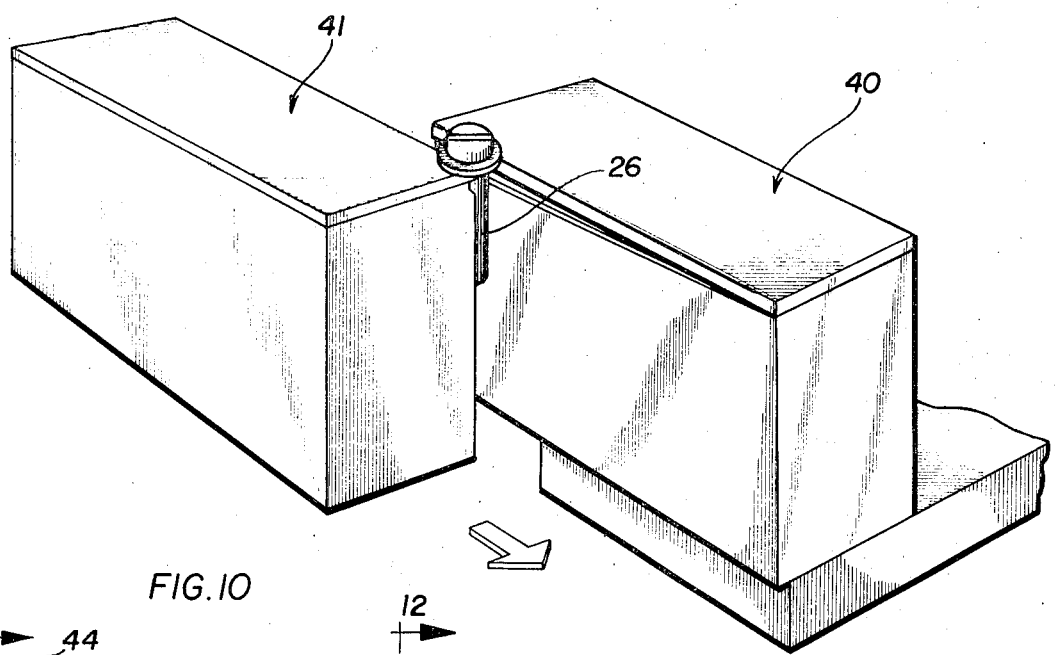
FIG. 9 is a perspective view showing, in simplified form, rolling dies used to form the washer-retaining ridges and associated groove upon the screw shank.
Figure 10:
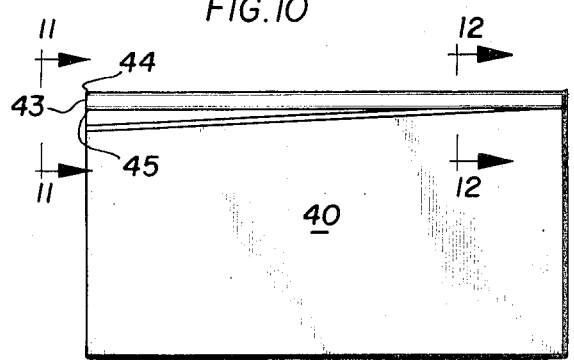
FIG. 10 is an elevational view showing the face of one of the rolling dies illustrated in FIG. 9.
Figure 13:
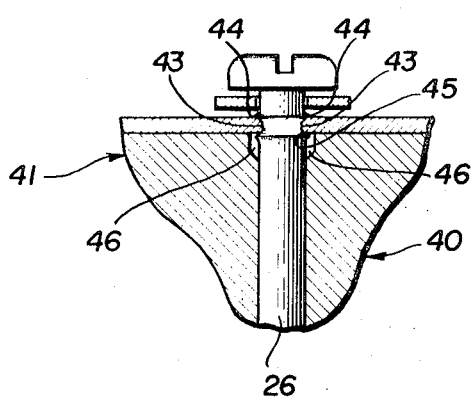
Figure 14:
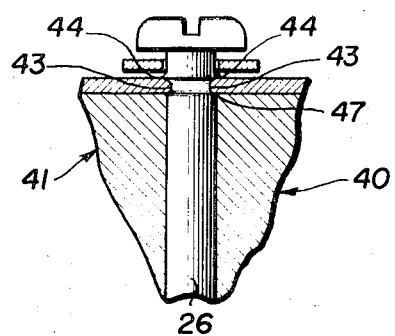

FIG. 13 is a sectional view taken substantially in the plane of line 11—11 in FIG. 10 and showing a typical screw blank shank and a first pre-assembled washer as they appear as the washer-retaining ridges and groove are being rolled into the periphery of the screw blank the width of said groove being exaggerated for purposes of illustration; and FIG. 14 is a sectional view taken substantially in the plane of line 12—12 in FIG. 10 and showing in further detail the screw blank shank and first pre-assembled washer as the lowermost washer-retaining ridge is rolled out of the screw blank.

While the invention will be described in connection with a preferred embodiment and procedure, it will be understood that it is not intended to limit the invention to that embodiment or procedure. On the contrary, it is intended to cover all alternatives, modifications, and equivalents as may be included within the spirit and scope of the invention.

Turning first to FIG. 1, there is shown a typical embodiment of a pre-assembled sems washer and screw terminal 20 of the present invention. The terminal 20 may be used for connecting spade-type electrical fasteners 21, wires, or other connectors (not shown) to an associated workpiece 22.

The sems terminal 20 includes in general a screw member 24 which may be considered to have a relatively upper head portion 25 and a relatively lower shank portion 26 threaded for engagement with associated threads 27 formed in the workpiece 22; the terminal 20 can be turned into the workpiece by a screwdriver or other driving device inserted into a slot 28 formed in the screw member head 25. To assure secure mechanical and electrical contact between the electrical connector 21 and the terminal 20, a relatively upper or first washer 30 and a relatively lower or second washer 31 are pre-assembled upon the shank 26 of the screw member 25.

In accordance with the invention, the electrical connector 21 can be quickly and easily inserted between the washers 30 and 31 by orienting the sems terminal 20 in an upright position as illustrated in FIG. 1. When the terminal 20 is thus oriented, the second or lower washer 31 drops away through a limited distance from the first or upper washer 30. This is accomplished by forming a washer-retaining ridge 33 immediately below the upper washer 30 upon the screw shank, as more clearly illustrated in FIGS. 6-9, to retain the upper washer 30 adjacent the screw head 25. After insertion of the connector 21 between the two spaced apart washers 30 and 31, the connector 21 and terminal 20 can be quickly and positively secured to the associated workpiece 22 simply by turning the screw member 24 into the associated workpiece 22, as illustrated in FIG. 2. Electrical contact between the terminal and the connector can be enhanced by copper plating the washers 30 and 31.

In accordance with another aspect of the invention, this novel sems terminal 20 can be formed quickly and inexpensively by using rolling or other threaded-member forming techniques. As shown in FIGS. 3-8, a screw member blank 34 is formed with the above-described upper head portion 25 and lower shank portion 26, and the upper washer 30 having a predetermined inner diameter X is assembled thereon. After the upper washer 30 has been assembled upon the screw blank 34, the ridge 33 is formed around the shank below the first washer to an outer diameter Y larger than the inner diameter X of the upper washer 30.

In carrying out the invention, the ridge 33 may be formed by die rolling a groove 35 into the shank 26. The shank material displaced from the groove 35 forms adjacent ridges 33 and 37 extending radially outwardly of the shank immediately above and below the groove 35, as best seen in FIG. 6, the dimensions thereof being exaggerated for illustrative purposes.

To permit the second or lower washer 31 to fit snuggly adjacent the upper or first washer 30, the second or lower ridge 37 is thereafter removed from the shank. In the illustrated embodiment, this is accomplished by compressing the material forming the lower ridge 37 back into the shank 26, as further described below.

After the second ridge 37 has been removed from the shank 26, the second lower washer 31 is assembled over the screw shank. It is a feature of the invention that the second or lower washer 31 may be snugged against the first or top washer 30 and, to that end, the internal diameter Z of the second washer 31 is preferably selected to be larger than the diameter Y of the upper washer-retaining ridge 35.

It will be understood that additional washers (not shown) may be assembled upon the shank 26 if desired. By means of such additional washers, additional electrical connectors may be accommodated upon the pre-assembled terminal.

After the lowermost washer 31 has been assembled upon the shank 26, screw threads are formed upon the shank. To retain the lower washer 31 upon the shank 26, the threads below the second washer 31 are formed, by rolling or other known means, to a major diameter M larger than the inner diameter Z of the second washer 31, thereby preventing the second washer 31 from slipping down the shank 26 more than a predetermined distance away from the first washer 30. Free rotation of the washers upon the pre-assembled terminal is provided by providing both washers 30 and 31 with inner diameter X and Z, respectively, which are larger than the shank member 26.

Figure 11:
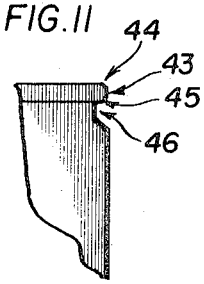
FIG. 11 is a fragmentary elevational view taken substantially from the aspect of the plane denoted by line 11—11 in FIG. 10 and showing the shape of the rolling die face at a preliminary stage of shank groove and ridge formation.
Figure 12:
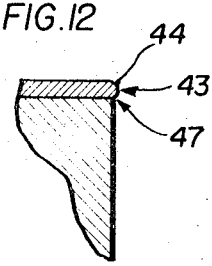
FIG. 12 is a sectional view taken substantially in the plane of line 12—12 in FIG. 10 and showing the shape of the rolling die at a subsequent stage of shank groove and ridge formation.

The described grooves 35 and adjacent ridges 33 and 37 can be rolled into the screw shank 26 by means of rolling dies 40, 41 as illustrated in FIGS. 9-14. To form the groove 35 described above, both the stationary die 40 and the movable die 41 are formed at their initial or approach ends with struck-up lands 43. Each land is provided with oppositely facing beveled surfaces 44 and 45, as illustrated in FIGS. 11 and 13, which permit the material displaced by the lands 43 to flow radially outwardly.

In conjunction with the beveled surfaces 45 there is provided on each die, at the work entering portion thereof, a groove or recess 46 which initially accommodates the disposed material forming ridge 37. The grooves 46 do not extend for the entire length of the die, but merge smoothly into planar surfaces or areas 47.

Accordingly, upon initial operation and movement of the dies to engage the blank, the groove 35, first ridge 33 and second ridge 37 will be formed by the action of lands 43, see FIG. 13. As relative movement of the dies continues, the planar surfaces or areas 47 of the dies will come into contact with the groove blank. When this occurs, as shown in FIG. 14 the integrity of the groove 35 and ridge 33 are maintained by the lands 43 and beveled surfaces 44; however, the planar die areas 47 will flatten or wipe out the second ridge 37 cold working the blank material back into shank 26. The preassembled blank, and first washer 30, produced by the initial rolling operation is thus ready for acceptance of the second washer 31, and subsequent roll threading of the shank portion 26.

The following is claimed as invention:

1. A pre-assembled screw and washer terminal for use with spade-type and like connectors, said terminal comprising, in combination, a screw member having an enlarged relatively upper head and a relatively lower shank, a first washer having a pre-determined inner diameter and mounted on the screw member shank, retaining means formed upon the shank member below said first washer for preventing said first washer from slipping down said shank away from said head, a second washer having a pre-determined inner diameter carried relatively below said first washer on said shank, and screw threads formed on said shank for engaging a workpiece, the threads below said second washer having a major diameter larger than said predetermined inner diameter of said second washer for preventing said second washer from slipping down said shank and away from said first washer more than a predetermined distance.

2. A device according to claim 1 wherein said retaining means is formed to a diameter smaller than the inner diameter of said second washer, but to a diameter larger than the inner diameter at said first washer, thereby retaining the first washer adjacent the screw member head and permitting the second washer to be snugged against the first washer.

3. A device according to claim 1 wherein both washers are provided with inner diameters larger than said screw member shank, thereby permitting free rotation of said washers on said screw shank.

4. A device according to claim 1 wherein said retaining means includes a ridge formed on said shank, said ridge having a maximum outer diameter greater than the inner diameter of said first washer.

5. A device according to claim 1 wherein said retaining means is provided by a groove rolled in said shank below said first washer, with the material disposed upon rolling of said groove providing upper and lower annular ridges on opposite sides of said groove, said upper ridge having a diameter greater than the inner diameter of said first washer, and said lower ridge being compressed to a diameter less than the inner diameter of said second washer.

6. A device according to claim 1 wherein at least one additional washer is carried on said screw shank above said threads formed thereon and below said first washer.

7. A device according to claim 6 wherein said second and third washers are copper plated.

* * * * *